United States Patent [19]

Clement, II et al.

[11] Patent Number: 4,891,061
[45] Date of Patent: Jan. 2, 1990

[54] PROCESS FOR TREATING SPEISS

[75] Inventors: Thomas P. Clement, II, Belle Mead; John R. Wettlaufer, Asbury; Jack A. Scott, Somerville, all of N.J.

[73] Assignee: ASARCO Incorporated, New York, N.Y.

[21] Appl. No.: 854,237

[22] Filed: Apr. 21, 1986

[51] Int. Cl.4 .............................................. C22B 7/04
[52] U.S. Cl. .......................................... 75/24; 75/63; 75/69; 75/72; 75/78; 75/89; 75/101 R; 75/121; 423/88; 423/617
[58] Field of Search ................. 423/87, 88, 617; 75/6, 75/24, 7, 63, 69, 72, 78, 101 R, 121, 89

[56] References Cited

U.S. PATENT DOCUMENTS

| 824,699 | 7/1906 | Atkinson | 423/88 |
|---|---|---|---|
| 1,097,897 | 5/1914 | Trifonoff | 75/69 |
| 1,528,004 | 5/1987 | Bassett | 423/617 |
| 1,863,807 | 6/1932 | Schopper | 423/48 |
| 2,381,970 | 8/1945 | Collins | 75/24 |
| 3,883,345 | 5/1975 | Caldon et al. | 75/69 |
| 3,969,202 | 7/1976 | Albrethsen et al. | 75/69 |
| 4,252,563 | 2/1981 | Sundstrom | 75/71 |
| 4,497,780 | 2/1985 | Barin et al. | 423/87 |
| 4,578,254 | 3/1986 | Malmstrom | 423/88 |

FOREIGN PATENT DOCUMENTS 372189  5/1932  United Kingdom .................. 423/87

OTHER PUBLICATIONS

Chemical Abstracts, vol. 5:1729 The Working Up of Speiss—C. Guillemain.
Chemical Abstracts, vol. 13:1296 Treatment of Complex Speisses—P. Papencordt.
Chemical Abstracts, vol. 20:889 Recovery of Arsenic and Other Valuable Constituents from Speiss—C. P. Linville.
Chemical Abstracts, vol. 25:5882 Reactions in the Removal of Arsenic from Speiss by Heating in the Presence of Pyrites—V. Tafel and H. W. Loose.
The Metallurgy of Lead, pp. 279-283.

Primary Examiner—Robert L. Stoll
Attorney, Agent, or Firm—John J. Tomaszewski; Kenneth A. Koch

[57] ABSTRACT

Arsenic and antimony are separated from speiss by a roasting operation employing pyrite and coke and the arsenic is separated from the resultant product by a water pressure leaching operation.

7 Claims, 1 Drawing Sheet

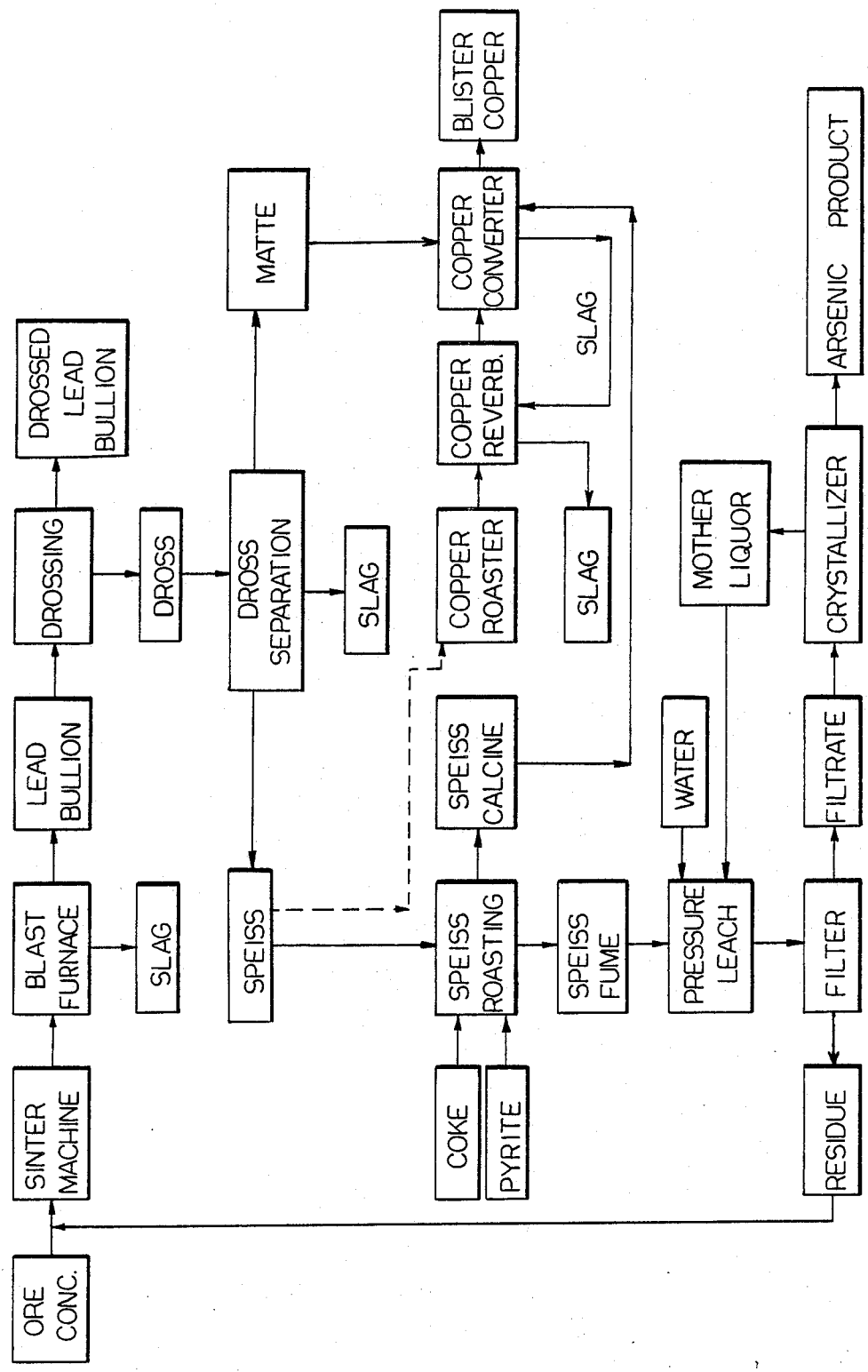

PROCESS FOR TREATING SPEISS

BACKGROUND OF THE INVENTION

The present invention relates to the treatment of speiss and, more particularly, to the separation, recovery and purification of arsenic and antimony from the speiss by a roasting operation and a leaching process.

Many ores contain significant amounts of arsenic and antimony in addition to other elements. Some ores, in particular lead ores, contain large amounts of copper and other speiss forming metals and are conventionally processed by roasting and sintering the ore concentrate and then smelting the sinter in a blast furnace. Molten lead bullion from the furnace may then be treated in a variety of ways to separate the lead from the other constitutents of the bullion. U.S. Pat. No. 4,404,026 shows both a conventional drossing purification operation whereby matte and speiss phases are separated from the bullion and an improved method to produce purer matte and speiss phases by using sodium addition to the bullion. The disclosure of this patent is hereby incorporated by reference.

The matte phase is composed primarily of a PbS-$Cu_2S$ mixture while the speiss phase consists of $Cu_3As$, $Cu_3Sb$ and $Fe_2As$, usually intermingled with an additional emulsion of very fine PbS-$Cu_2S$ matte particles. The matte phase which contains, by weight, mostly copper, about 50%, and lead, about 11%, and small amounts of arsenic, antimony and precious metals, e.g., silver, is typically added to the copper converters in the copper circuit to recover the copper and produce blister copper.

The speiss phase contains, by weight, mostly copper, about 50-60%, lead about 8-12%, and a large percentage of the arsenic, antimony and silver of the lead ore. Normally the speiss is also added to the copper circuit at the copper roaster stage to recover the copper and silver values but the presence of the arsenic and antimony impurities leads to a build-up of these metals in the circuit and to environmental as well as impurity problems in the copper refining process. One practice is to dilute the level of these impurities by stockpiling the speiss and limiting the amount of speiss processed. This practice is uneconomical since the copper and silver are tied up in inventory instead of being produced into finished products.

Accordingly, it is an object of the invention to separate arsenic and antimony from speiss.

It is another object of the invention to treat the recovered arsenic and antimony from the speiss to separate the arsenic from the antimony in a commercially pure form.

It is still another object of the invention to provide a lead ore treatment process whereby the recovery of the copper and silver in the ore is enhanced in the copper circuit by the removal of arsenic and antimony from the speiss.

Additional objects and advantages will be readily apparent as the invention is hereinafter described in detail.

SUMMARY OF THE INVENTION

Arsenic and antimony are volatilized (fumed) from speiss by roasting the speiss in the presence of controlled amounts of a sulfur source and a carbon source. The roasted speiss (calcine) is added to the copper circuit to recover the copper, silver and other metals present therein. The fume from the roasting operation is contacted with water at an elevated temperature and pressure to selectively separate the arsenic in commercially pure form from the antimony, with the antimony residue being recycled to the lead circuit, e.g., at the sintering operation or to the blast furnace.

BRIEF DESCRIPTION OF THE DRAWING

The accompanying drawing is a diagrammatic flow sheet illustrating one embodiment of the process of this invention.

DETAILED DESCRIPTION OF THE INVENTION

Although the process in accordance with the invention can be employed to treat speisses from 11 sources, e.g., nickel ores, the invention will be described with reference to a speiss obtained from a lead circuit containing speiss forming copper values. Typical compositions of these speisses vary widely and typically contain, by weight, about 50 to 60% copper, 8 to 12% lead, 0.5 to 1.5% iron, 1 to 5% sulfur, 15 to 20% arsenic, 5 to 10% antimony and in oz./ton, about 100 to 500 silver. As noted hereinabove, the speiss typically consists of $Cu_3As$, $Cu_3Sb$ and $Fe_2As$, intermingled with an additional emulsion of very fine PbS-$Cu_2S$ matte particles.

The speiss is generally granulated and is typically prepared by pouring the molten speiss into water. The resultant speiss particle size varies from a fine powder to about ¼ inch.

While the speiss may be roasted using any apparatus and in a batch or continuous operation, it is preferred to roast the speiss continuously using for example a Godfrey Roaster because of its demonstrated effectiveness. Using a Godfrey Roaster, it is preferred to mix the speiss, sulfur source and carbon source and to add the mixture continuously to the roaster bed near the center of the roaster hearth. Hearth rotation may be adjusted and is preferably coordinated with the number and spread of the rabbling plows to provide a residence time on the hearth sufficient to substantially volatilize the arsenic and antimony of the speiss. By volatilization is meant a visible white fume rising above the surface of the bed. It is preferred to adjust the hearth rotation to provide a visible volatilization over most of the bed surface, e.g., 90%, with volatilization substantially being complete by the last 1-3 (outside) rows formed by the rabble blades and the bed material.

The temperature of the bed of material may vary widely and is about 900° to 1300° F., preferably 1050° to 1250° F. At a residence time on the hearth of about 1 hour and a temperature of about 1100° to 1200° F., substantially complete volatilization of the bed is obtained. Typically under these conditions more than 70% of the arsenic and antimony are volatilized. In general, increasing the temperature and/or residence time increases the amount of arsenic and antimony volatilized. Increased rabbling and mixing of the bed also increases the rate and amount of arsenic and antimony volatilized.

It is important that both a sulfur source and carbon source be employed with the speiss in the bed to provide an effective roasting process. Broadly stated, the sulfur source appears to combine with the copper of the speiss and releases the arsenic and antimony and the sulfur source is present in an amount sufficient to release the desired amount of arsenic and antimony. Any sulfur source containing labile sulfur or elemental sulfur may be employed with pyrite being preferred because of its demonstrated effectiveness. In general, an amount of pyrite, based on speiss, of about 30% to 85%, preferably 45% to 80% and most preferably about 50% to 75% may be suitably employed.

It is unclear what role the carbon source plays in the process and it is hypothesized that it provides a reducing atmosphere in and near the surface of the bed and also acts as a diluent to provide a surface of a nonmelting species to prevent sticking of the roasting particles. Without the carbon source the bed coalesces to form a sticky mass which cannot be effectively roasted. The preferred carbon source is granulated petroleum coke breeze containing about 86% fixed carbon although other sources such as coal and other types of coke may also be used. An amount of coke, based on speiss, of about 10% to 50%, preferably 20% to 40%, e.g., 25%, may be suitably employed.

The particle size of the sulfur source and carbon source may vary widely and is preferred to be less than ½ inch, e.g., ¼ inch. It is preferred that the sulfur source be of a fine particle size, e.g., less than about 50 mesh and more preferably less than about 150 mesh.

The roasted speiss (calcine) is discharged from the roaster through a drop chute located on the periphery of the roaster and is ready for addition to the copper circuit, e.g., to the converters or roasters.

The fume from the roasting process contains most of the arsenic and antimony of the speiss with recoveries of both elements typically being greater than about 70%. The fume is treated to separate the arsenic from the antimony by pressure leaching with water or other suitable solvent at an elevated temperature for a sufficient time to separate greater than about 50% of the arsenic, and preferably greater than about 75% of the arsenic. Water is the preferred leachant and a preferred temperature is greater than about 125° C., more preferably above about 150° C., and most preferably above about 180° C., at the corresponding pressure. A highly preferred temperature range is 180-200° C.

In general, the fume is mixed with at least sufficient water to form a pumpable slurry and to achieve the desired recovery of arsenic. A preferred % solids based on weight is about 5% to 15% because of its demonstrated effectiveness. A residence time of greater than about 30, e.g., 40 minutes is preferred with a typical residence time being about 1 hour. Stirring of the fume/water mixture is preferred to increase the separation efficiency of the leachant process.

As will be appreciated by those skilled in the art, separation of the arsenic from the antimony will depend on the temperature and the % solids ratio with, in general, an increase in the temperature and/or a decrease in the ratio increases the rate and degree of separation.

Other arsenic and antimony containing materials such as copper converter cotrell dust, fume and dust from the roasting of copper concentrates and refinery, e.g., lead refinery by-product dusts may also be treated using the process of the invention.

After the leaching process, the mixture is filtered to separate the arsenic solution from the antimony residue. The arsenic may be separated from the filtrate by crystallization, evaporation or any other conventional technique. The residue may be recycled to the sintering machine or blast furnace or any other desired point in the lead ore separation process.

With reference to the flow sheet of drawing, an ore concentrate obtained from lead ore is charged to a sinter machine to remove sulfur and form lead oxide. The sinter is then fed to a blast furnace with flux and fuel and heated at a high temperature to form molten lead bullion and a slag. The bullion as it flows from the furnace contains alloyed metallic impurities and is drossed as shown in U.S. Pat. No. 4,404,026, supra, to form matte and speiss phases and slag, with the matte phase being delivered to the copper circuit at the converter stage.

Following the prior art process as shown by the dotted line, the speiss is added directly to the copper circuit in the copper roaster stage. In the process of the invention, the speiss is roasted with coke and pyrite to produce a speiss calcine containing significantly less arsenic and antimony copper circuit impurities. The speiss calcine, as with the matte phase, may be added to the copper converter stage.

The speiss fume is subjected to a water pressure leach to separate the arsenic from the antimony. It has been found that the use of a Godfrey Roaster produced a fume of mixed arsenic and antimony oxides and that the arsenic product recovered from the water pressure leach is arsenic trioxide having a purity greater than 99%. The antimony residue is in the form of antimony oxide and is recycled to the sinter machine or blast furnace. Antimony in the recycle residue reports to the bullion phase and is typically recovered in the lead bullion refining process. Mother liquor from crystallization of the arsenic containing filtrate is desirably recycled to the pressure leach stage.

The following examples are given for purposes of illustration only and are not to be considered as constituting a limitation on the present invention. All parts and percentages given are by weight and temperatures in degrees centigrade unless otherwise indicated.

EXAMPLE I

Speiss granulate obtained from the processing of lead ore concentrate was introduced into a Godfrey Roaster near the center of the hearth at a rate of 14.6 tons/day, together with pyrite (8.8 tons/day) and petroleum coke breeze (3.6 tons/day). The speiss contained, by weight, 18.9% arsenic, 5.9% antimony, 51.3% copper, 2.9% sulfur, 1.1% iron, 11.2% lead and 321 oz /ton silver. The pyrite had a particle size of less than about 150 mesh and the coke a particle size or less than about ¼ inch.

The roaster was fired with natural gas. A residence time of about 1 hour and a bed temperature of 1180°-1225° F. was maintained during the run. The roaster has a diameter of 25 feet-11 inches and rotated at about 0.34 revolutions/minute. One rabble arm with 28 rabble blades was employed.

Analysis of the speiss calcine was, by weight, 33.6% copper, 6.4% lead, 3.7% arsenic, 0.62% antimony, 5.7% sulfur, 13.5% iron and 201 oz./ton silver. The fume analysis was 59.5% arsenic, 3.5% antimony, 1.8% copper, 6.5% iron, 0.7% lead and 0.7 oz./ton silver. Balance to 100% for both the calcine and fume is for oxygen and impurities such as silica.

EXAMPLE II

Fume produced from a speiss roasting process similar to that set forth in EXAMPLE I assayed 54.5% arsenic, 4.5% antimony, 2.9% copper, 5.4% iron and 0.8% lead. Based on a fume weight of 1 ton, the fume was pressure leached with 290 gallons of water and 2140 gallons of mother liquor at 200° C. for 1 hour in a pressurized stirred reactor. 0.388 tons of residue was recovered assaying 21% arsenic, 11.1% antimony, 10.3% copper, 16.5% iron and 2.1% lead. The arsenic trioxide product recovered was 0.612 tons and assayed 75.5% arsenic, 0.06% antimony, 0.06% copper, 0.13% iron and 0.02% lead, the balance being oxygen.

It will be apparent that many changes and modifications of the several features described herein may be made without departing from the spirit and scope of the invention. It is therefore apparent that the foregoing description is by way of illustration of the invention rather than limitation of the invention.

We claim:

1. A process for separating arsenic and antimony from speiss in an apparatus having an inlet, an outlet, heating means and a hearth comprising:
   (a) supplying the speiss, a solid sulfur source which combines with the copper of the speiss and a solid carbon source selected from the group consisting of coal and coke to the inlet of the apparatus forming a bed on the hearth;
   (b) moving the bed over the hearth to the outlet of the apparatus while maintaining the bed at a temperature of about 900° F. to 1300° F. for a sufficient time to volatilize arsenic and antimony oxides; and
   (c) separating the volatilized arsenic and antimony oxides from the heated bed on the hearth.

2. The process of claim 1 wherein the speiss is from the drossing of lead bullion.

3. The process of claim 2 wherein the sulfur source is pyrite.

4. The process of claim 3 wherein the carbon source is coke.

5. The process of claim 4 wherein the temperature is about 900° F. to 1300° F.

6. A process for the separation of arsenic and antimony from speiss in an apparatus having an inlet, an outlet, heating means and a hearth comprising:
   (a) supplying the speiss, a solid sulfur source which combines with the copper of the speiss and a solid carbon source selected from the group consisting of coal and coke to the inlet of the apparatus forming a bed on the hearth;
   (b) moving the bed over the hearth of the outlet of the apparatus while maintaining the bed at a temperature of about 900° F. to 1300° F. for a sufficient time to volatilize arsenic and antimony oxides and to form a speiss calcine;
   (c) separating the volatilized arsenic and antimony oxides from the heated bed on the hearth, the speiss calcine having a reduced arsenic and antimony content;
   (d) forming a slurry of the volatilized arsenic oxide and antimony oxide product with water;
   (e) maintaining the slurry at an elevated temperature and pressure for a sufficient time to separate the arsenic oxide from the antimony oxide, the arsenic oxide dissolving in the water; and
   (f) separating the arsenic containing water from the solid antimony oxide material.

7. The process of claim 6 wherein the solid antimony material from step (f) is recycled to a lead concentrate treating process which produces lead bullion from the lead concentrate.

* * * * *